FREQUENCY SELECTIVE CIRCUITS

Filed Aug. 28, 1953

INVENTORS
JACK AVINS
& MARVIN H. KRONENBERG
BY [signature]
ATTORNEY 2,898,398

FREQUENCY SELECTIVE CIRCUITS

Jack Avins, Staten Island, and Marvin H. Kronenberg, Queens Village, N.Y., assignors to Radio Corporation of America, a corporation of Delaware Application August 28, 1953, Serial No. 377,208

4 Claims. (Cl. 178—5.4)

The present invention relates to frequency selective piezo-electric quartz crystal filter circuits, and more particularly, but not necessarily exclusively, to resonant piezo-electric quartz crystal circuits for providing a continuous wave in response to recurrent signals.

Piezo-active quartz crystals are sometimes employed in frequency selective filter circuits for passing a discrete band of frequencies. While conventional crystal filter circuits generally possess a relatively high efficiency or Q, it has been found that the maximum efficiency obtainable is limited by the action of the circuitry associated with the crystal.

In one system of color television transmission, a color synchronizing signal is transmitted so that a wave of fixed frequency and phase may be established at a color television receiver for purposes of demodulating a color subcarrier wave. This color synchronizing signal, sometimes termed the "burst," is transmitted immediately following the conventional horizontal synchronizing pulse component on that portion of the blanking pedestal commonly known as the "back porch." A discussion of color synchronizing signals may be found in U.S. Patent No. 2,594,380, granted May 29, 1952 to L. E. Barton and P. H. Werenfels for "Synchronizing Apparatus for Color Signal Sampling Oscillators." Generally, burst color synchronization is the subject matter of a copending application of A. V. Bedford entitled "Synchronizing Apparatus," Serial No. 143,800, filed February 11, 1950, now Patent No. 2,728,812, issued December 27, 1955.

One method for establishing a continuous reference frequency wave at a color television receiver is to gate out a portion of a component color television signal containing the color synchronizing signal and then to apply the separated color synchronizing signal across a frequency selective filter circuit. If the filter circuit is resonant at the frequency of the color synchronizing signal, a train of waves of the frequency and phase of the color synchronizing signal is provided, which may be amplified for use as a reference frequency wave for purposes of demodulating a color subcarrier signal. One such system is shown and described in the copending U.S. patent application of Jack Avins entitled "Color Synchronization," Serial No. 238,162, filed July 23, 1951, now Patent No. 2,712,568, issued December 27, 1955. It will be appreciated that the resonant filter circuit used in a system of this type should have as high an efficiency as possible in order that the continuous wave generated in response to the bursts of color synchronizing signal may have as nearly a constant amplitude as possible.

Therefore, it is an object of this invention to provide a crystal filter circuit having improved efficiency.

It is another object of the present invention to provide an improved piezo-electric quartz crystal filter circuit for passing waves having frequencies within a discrete band of frequencies.

It is still another object of the present invention to provide an improved resonant filter circuit for providing a substantially continuous wave when energized by recurrent signals having a frequency substantially equal to the series resonant frequency of a selected piezo-electric quartz crystal.

According to this invention an improved resonant high efficiency piezo-electric quartz crystal filter is provided by energizing a piezo-electric quartz crystal from a high impedance source via an impedance transforming $\pi$ network which presents a relatively low impedance to the crystal. In one embodiment of the present invention the signal appearing at the output of the piezo-electric quartz crystal is coupled to another high impedance circuit via an additional impedance transforming $\pi$ network which presents a relatively low impedance to the output of the crystal.

In another embodiment of the invention a piezo-electric quartz crystal is energized from a high impedance source via a resonant impedance transforming $\pi$ network, and the signal appearing at the output of the piezo-electric quartz crystal is applied to the cathode circuit of a succeeding amplifier.

Other and incidental objects of this invention will become apparent upon a reading of the following specification and an inspection of the drawings in which.

Figure 1:
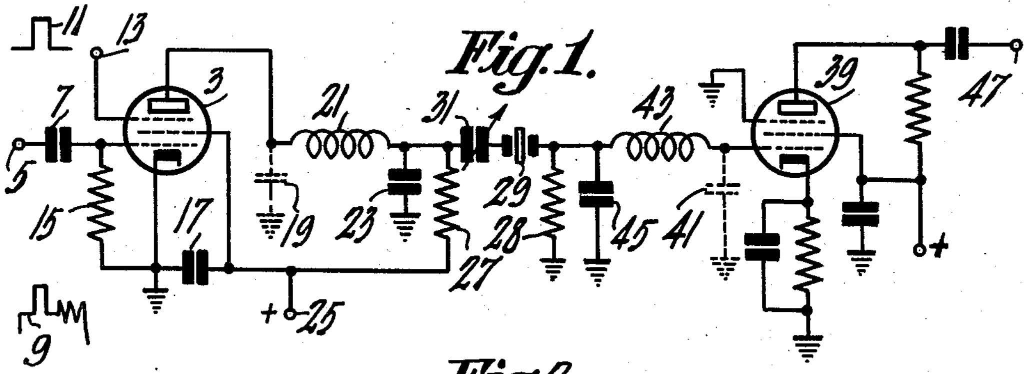
Figure 1 is a schematic circuit diagram including an illustrative embodiment of the present invention which is adapted to provide a continuous wave in response to recurrent bursts of a selected signal.

Turning now in detail to Figure 1, an electron tube 3 may be rendered conducting at suitable recurrent intervals in time for separating a color synchronizing signal, or the like, from a composite signal. A conventional television synchronizing signal, including a color synchronizing signal positioned on the back porch is shown at 9 and this signal may be applied to a control electrode of the electron tube 3 via a terminal 5 and a coupling capacitance 7. A gating pulse 11 for rendering the electron tube 3 conducting may be applied to the suppressor electrode of the electron tube 3 via a terminal 13. In the absence of the gating pulse 11, the electron tube 3 may be maintained non-conducting by some suitable biasing means not shown. The gating pulse 11 may be derived from a conventional horizontal deflection circuit.

In a conventional manner, the cathode of the electron tube 3 is connected to ground reference potential, a grid leak resistance 15 is connected between the control electrode of the electron tube 3 and ground reference potential, and the screen grid of the electron tube 3 is bypassed for alternating current energy by means of a bypass capacitance 17. The inter-electrode capacitance between the anode and ground reference potential, along with any stray capacitance in the circuitry associated with the anode, is indicated by a capacitance 19.

By suitably proportioning the inductance 21 and the capacitance 23, the combination of the capacitances 19, 23 and the inductance 21 may be made to present a high impedance to the anode of the electron tube 3. In certain instances it may be desirable to select the values of these components to provide a parallel resonant circuit.

Both the anode and screen grid of the electron tube 3 receive their positive operating potential via a terminal 25 to which may be connected a suitable power supply. In the case of the anode, a load resistance 27 is connected serially between the terminal 25 and the anode of the electron tube 3.

Since the capacitance 23 may be many times larger than the inter-electrode capacitance 19, it will be appreciated that the impedance appearing across the capacitance 23 may be much lower than the impedance across the capacitance 19. Thus the capacitances 19, 23 and the inductance 21 form an impedance transforming $\pi$ network which presents a relatively high impedance to the anode of electron tube 3 and a relatively low impedance to the piezoelectric quartz crystal 29.

Although a small trimmer capacitance 31 may be connected between the piezo-electric quartz crystal 29 and the impedance transforming network to adjust the resonance of the crystal to a desired reference frequency, it is preferable to have the series resonant frequency of the quartz crystal 29 near the reference frequency.

Figure 2:
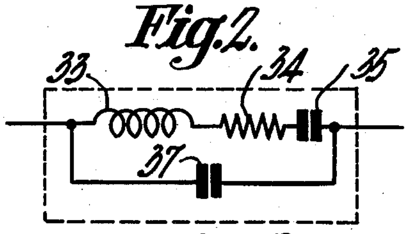
Figure 2 is an equivalent circuit diagram of a piezo-electric quartz crystal and its associated holder.

The piezo-electric quartz crystal may be represented by the equivalent circuit of Figure 2 wherein the series resonant branch comprises an inductance 33, a resistance 34 and a capacitance 35. The capacitance 37 represents the capacitance introduced by the crystal holder and associated circuitry for making electrical connection to the piezo-electric quartz crystal. Where the bypassing action of the capacitance 37 around the series resonant branch is objectionable, suitable neutralizing means for minimizing its effect may be employed. Information on the grinding and preparation of the piezo-electric quartz crystals to obtain a desired series resonant frequency may be found in the "Radio Engineers Handbook" by Terman at page 488, first edition.

Considering the series resonant branch, the maximum Q may be approached by providing a relatively low impedance connection between opposite ends of the series resonant branch. When the high Q series resonant circuit is energized by recurrent bursts of a selected frequency near the series resonant frequency of the circuit, a continuous wave of the selected frequency is provided. When the impedance presented to the series resonant circuit is of a larger magnitude, the continuous wave may be substantially damped between recurrent bursts.

Returning to Figure 1, the circuitry provides apparatus for energizing a piezo-electric quartz crystal from a relatively high impedance source such as the electron tube 3 by employing an impedance matching $\pi$ network which presents a relatively high impedance to the electron tube 3 and a relatively low impedance to the quartz crystal 29.

A similar impedance transforming $\pi$ network may be employed to couple the output side of the piezo-electric quartz crystal 29 to a relatively high impedance circuit such as a control electrode of an electron tube 39. The inter-electrode and stray capacitance of the control electrode of the electron tube 39 is represented by the capacitance 41 and forms one branch of an impedance transforming $\pi$ network including an inductance 43 and a capacitance 45. The electron tube 39 may be a conventional amplifier stage as shown or may be adapted to provide an amplitude limiting action.

Thus, a continuous wave appears at terminal 47 which is substantially constant in amplitude. Such a wave is suitable for use in color television receivers, or the like, for demodulating a color subcarrier wave.

Figure 3:
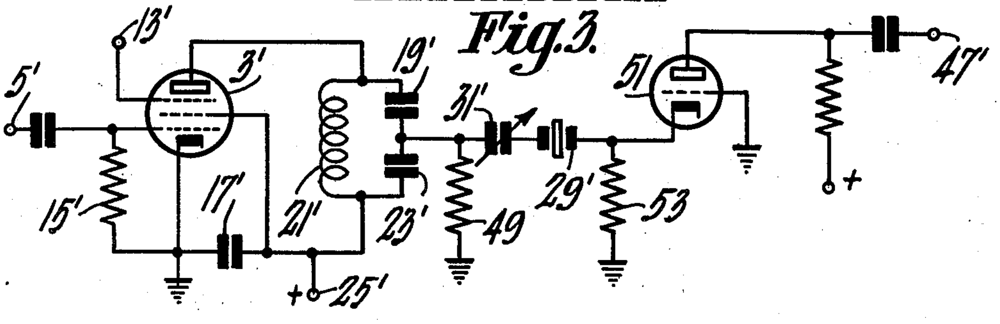
Figure 3 is a schematic circuit diagram including an illustrative embodiment of the present invention which may be employed to provide a continuous wave in response to recurrent bursts of a given frequency.

Figure 3 shows another embodiment of the invention including an alternative form of an impedance transforming $\pi$ network in the input circuit of the crystal filter, and an alternative low impedance crystal output circuit utilizing a grounded grid amplifier stage. The various components appearing in Figure 3 which perform a similar function to those of Figure 1, are indicated by primed numbers. In the case of the electron tube 3' the anode is connected to a parallel resonant circuit comprising an inductance 21' and the capacitances 19' and 23'. It will be noted that the interelectrode capacitance of electron tube 3' is not relied upon to form one branch of an impedance transforming $\pi$ network. However, by keeping the component value of capacitance 19' small with respect to the component value of the capacitance 23', an impedance transforming operation may be accomplished.

Thus, the parallel resonant circuit comprising the inductance 21', the capacitance 19' and the capacitance 23' functions in a similar manner to the impedance transforming network of Figure 1 except for the fact that one end of the inductive branch is effectively grounded for signal frequencies via the bypass capacitance 17', and the signal is taken from the common connection between capacitances 19' and 23'. Since capacitance 23' is relatively large, a low impedance is presented to the piezo-electric quartz crystal 29'.

A resistance 49 may be connected as shown between the common connection of the capacitance 19' and 29' and ground reference potential so as to maintain this part of the circuit at a fixed D.-C. potential. In the embodiment of Figure 3, the signal appearing at the output of the quartz crystal 29' is connected directly to the cathode of an amplifying electron tube 51. A resistance 53 connected between the cathode and ground reference potential provides a relatively low impedance path between the output side of the piezo-electric quartz crystal 29' and ground reference potential. After being amplified by the electron tube 3', a continuous wave appears at terminal 47'. This wave may be further amplified or amplitude limited in order to provide a suitable demodulating wave for use in a color television receiver or the like.

Figure 4:
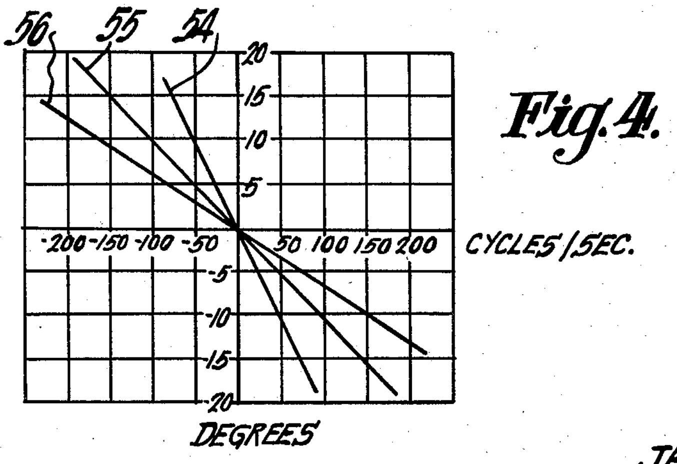
Figure 4 is a graphical illustration of phase shift versus frequency separation for different values of circuit components in the embodiment of Figure 1.

The operating characteristics of the embodiment of Figure 1 are illustrated in Figure 4 in which there is shown the phase of a continuous wave output as a function of the frequency separation between the recurrent input signal and the piezo-electric quartz crystal circuit resonance. Curve 54 indicates the relationship where the resistances 27 and 28 are of the order of 220 ohms; curve 55 indicates the relationship where the resistances 27 and 28 are of the order of 560 ohms; and curve 56 indicates the relationship where the resistances 27 and 28 are of the order of 1000 ohms. Thus for a given frequency separation the phase shift decreases for increasing values of resistances 27 and 28.

Having described the invention, what is claimed is:

1. In a color television receiver, the combination of, a source of color television signals including color synchronizing bursts having a predetermined frequency and prescribed duration intervals, a first amplifying electron tube having at least a cathode, anode, a first and second control electrode, said anode of said first electron tube having interelectrode capacitance with respect to said cathode of said first electron tube, means for coupling said source of color television signals to said first control electrode of said first electron tube, a source of keying pulses having the duration intervals of said color synchronizing bursts, means for coupling said keying pulses source to said second control electrode of said first electron tube, an inductance and a capacitance connected serially between the anode and cathode of said electron tube, said inductance and said capacitance being of suitable value to provide an impedance transforming $\pi$ network when taken in combination with the interelectrode capacitance between said anode and said cathode of said electron tube, a second amplifying electron tube having at least an anode, cathode and control electrode, said control electrode of said second electron amplifying tube having interelectrode capacitance with respect to the cathode of said second electron tube, a second inductance and a second capacitance coupled serially between the control electrode and cathode of said second electron tube, said second inductance and said second capacitance being of suitable value to provide an impedance transforming $\pi$ network when taken in combination with the interelectrode capacitance between the control electrode and cathode of said second amplifying electron tube, and a piezoelectric quartz crystal having a series resonant frequency equal to said predetermined frequency coupled between said first impedance transforming $\pi$ network and said second impedance transforming $\pi$ network to develop a substantially continuous wave of said predetermined frequency at the anode of said second amplifying electron tube.

2. In a color television receiver, comprising a source of color television signals including intermittent color synchronizing bursts, the combination comprising means coupled to said source for separating said color synchronizing bursts, said separating means having an output terminal, a piezoelectric quartz crystal being effectively series resonant at a frequency in the immediate vicinity of the frequency of said color synchronizing bursts, a signal amplifying means having an input terminal, an impedance transforming $\pi$ network comprising a series element and a pair of shunt elements, and means including said series element and said crystal effectively in series for coupling said color synchronizing burst separation means output terminal to said signal amplifying means input terminal.

3. In a color television receiver provided with a source of composite color television signals including periodically recurring color synchronizing bursts, the combination comprising a burst gating device coupled to said source and adapted to provide at an output terminal separated color synchronizing bursts, a signal amplifying device having an input terminal, a piezo-electric crystal being effectively series resonant at a frequency substantially corresponding to the frequency of said color synchronizing bursts, a capacitor presenting an impedance of a first magnitude at the frequency of said color synchronizing bursts, means for connecting said capacitor and said crystal in series in the order named between said burst gating device output terminal and said signal amplifying device input terminal, an inductor, means for connecting said inductor between said output terminal and a point of signal reference potential, a reactive element presenting an impedance of a second magnitude at the frequency of said color synchronizing bursts, said second magnitude being small compared with said first magnitude, and means for coupling said reactive element between the side of said capacitor remote from said output terminal and the point of signal reference potential.

4. Apparatus in accordance with claim 3 also including means for tuning said crystal, said tuning means comprising a variable capacitor interposed between said first named capacitor and said crystal in the series connection between said output terminal and said input terminal.

References Cited in the file of this patent

UNITED STATES PATENTS

| | | |
|---|---|---|
| 2,485,863 | Chandler | Oct. 25, 1949 |
| 2,551,809 | Mortley | May 8, 1951 |
| 2,712,568 | Avins | July 5, 1955 |
| 2,713,612 | Nero | July 19, 1955 |

FOREIGN PATENTS

| | | |
|---|---|---|
| 829,429 | France | Mar. 28, 1938 |
| 960,741 | France | Nov. 7, 1949 |
| 514,249 | Belgium | Oct. 15, 1952 |

OTHER REFERENCES

Color TV, Rider Publication, page 142, 1954, G.E. diagram.